United States Patent [19]

Bratten

[11] Patent Number: 4,670,143

[45] Date of Patent: Jun. 2, 1987

[54] HORIZONTAL DRUM FILTER HAVING A DRIVE WHEEL AND INTERFITTING TUBE SECTIONS

[76] Inventor: Jack R. Bratten, 5970 St. James Dr., West Bloomfield, Mich. 48033

[21] Appl. No.: 772,123

[22] Filed: Sep. 3, 1985

[51] Int. Cl.⁴ .............................................. B01D 33/06
[52] U.S. Cl. ..................................... 210/234; 210/236; 210/237; 210/297; 210/298; 210/402
[58] Field of Search ............... 210/402, 470, 404, 406, 210/400, 784, 416.1, 401, 234, 236, 237, 297, 298; 285/24; 248/68.1; 74/112, 163, 813 R

[56] References Cited

U.S. PATENT DOCUMENTS

| | | | |
|---|---|---|---|
| 1,227,491 | 5/1917 | Robinson | 210/404 |
| 2,079,755 | 5/1937 | Wood | 210/236 |
| 2,725,145 | 11/1955 | Mylius | 210/402 |
| 3,768,655 | 10/1973 | Click et al. | 210/236 |
| 3,782,208 | 1/1974 | Hacker | 74/112 |
| 3,919,088 | 11/1975 | Doncer et al. | 210/402 |
| 4,008,158 | 2/1977 | Davis | 210/400 |
| 4,057,437 | 11/1977 | Kracklauer | 210/406 |
| 4,088,581 | 5/1978 | Carle | 210/401 |
| 4,370,231 | 1/1983 | LaValley | 210/406 |
| 4,391,331 | 7/1983 | Shotbolt | 285/24 |
| 4,407,720 | 10/1983 | Bratten | 210/777 |
| 4,421,647 | 12/1983 | Estabrook et al. | 210/401 |
| 4,515,693 | 5/1985 | Luthi | 210/406 |

FOREIGN PATENT DOCUMENTS

| | | | |
|---|---|---|---|
| 0113050 | 7/1984 | European Pat. Off. | 210/402 |
| 2508352 | 9/1976 | Fed. Rep. of Germany | 210/400 |
| 2052469 | 1/1981 | United Kingdom | 210/402 |

Primary Examiner—Richard V. Fisher
Assistant Examiner—Linda S. Evans
Attorney, Agent, or Firm—John R. Benefiel

[57] ABSTRACT

A filter of the type including a filter drum mounted within a settling tank containing a liquid to be filtered, with filtering flow drawn through a filter media on the outer surface of the drum, in which a fluid connection to the liquid circulation system is established by interfitting of tube sections as the filter drum is lowered into the tank at installation. Guiding members are included to properly position the drum as it is lowered to insure the tube sections move together as the filter drum is lowered. A valving arrangement is disclosed in one embodiment for isolating the particular drum filter from the circulation system upon removal. In another embodiment, an arrangement is utilized for producing intermittent rotation of the drum by engagement with the flights of a drag-out conveyor.

11 Claims, 9 Drawing Figures

HORIZONTAL DRUM FILTER HAVING A DRIVE WHEEL AND INTERFITTING TUBE SECTIONS

BACKGROUND OF THE INVENTION

1. Field of the Invention

This invention concerns filtering apparatus, and more particularly filtering arrangements including a drum filter submerged within a settling tank containing the liquid to be filtered, the liquid in the tank passing into an outer filter media layer on the drum filter to achieve filtration.

2. Description of the Prior Art

In filtration apparatus of the type described, it is necessary to establish a fluid connection between the drum filter and the remainder of the liquid circulation system to receive the filtered liquid. Such connection is desirably able to be readily made and unmade since the drums occasionally must be removed from the tanks for cleaning and other maintenance.

Since the drums are normally submerged in the tank, the making of such fluid connections is rather burdensome, particularly for the large filter sizes often used for industrial applications.

U.S. Pat. No. 4,407,720 granted to the present inventor describes a rotating drum filter of the type with which the present invention is concerned.

It has been heretofore known and practiced to establish a fluid connection by means of a sideways acting clamping mechanism which creates a loose sealing engagement with a opening in the side of the settling tank, the clamping mechanism being operable from above the liquid level in the tank. Such arrangements have been used for drum filters as well as for other type filter arrangements mounted within a settling tank.

The use of such clamping mechanism and sideways acting clamping mechanism adds to the expense and complication of the apparatus and also involves the making of the fluid connection by movement of the drum filter while submerged in the tank, which makes control over the drum motion cumbersome and uncertain.

In the filter arrangement according to U.S. Pat. No. 4,407,720 there is disclosed an improved backwash arrangement. The drum is formed by a series of circumferentially spaced but axially extending individual fluid passages, which are covered by a filtering layer of "wedge wire" or other filter media material, with the filtering flow drawing liquid through the outer filtering layer and into the axially extending individual passages. A backwashing flow is created successively through limited numbers of such passages at a time, such that filtering flow may continue through the remaining passages during backwashing flow through this limited number of passages, as described in detail in the aforementioned U.S. Patent.

This successive backwashing of limited areas of the drum surface media involves rotation of the drum, and as disclosed in the aforementioned U.S. Patent, an air motor and chain drive may be utilized.

In co-pending application, Ser. No. 520,184, filed on Aug. 4, 1983, there is disclosed a cylinder operated ratchet mechanism for producing incremental rotation of the drum. Such auxiliary mechanisms of course add to the expense and complexity of the filter apparatus. For low cost units it would be desirable to provide such indexing movement of the drum with only minimal apparatus.

Accordingly, it is an object of the present invention to provide an improved filtering apparatus of the type including a drum filter mounted within a settling tank in which a fluid connection may be established by a simple, reliable arrangement.

It is another object of the present invention to provide such filter arrangement in which the necessary fluid connection to the drum filter is established by the descending movement of the drum filtering upon lowering of the drum into a settling tank occurring when the drum is installed.

It is still another object of the present invention to provide an improved filter arrangement which does not require a sideways acting clamping mechanism.

It is yet another object of the present invention to provide an improved filter arrangement in which an indexing rotation of a rotary drum filter element is created without utilizing a separate drive mechanism.

SUMMARY OF THE PRESENT INVENTION

These and other objects of the present which will become apparent upon a reading of the following specification and claims are achieved by an arrangement for establishing a fluid connection with the liquid circulation system by guided descending movement of a drum filter into a settling tank occurring at installation. This arrangement includes a first tube section receiving outflow from the drum filter which extends vertically and is adapted to slidably mate with a second tube section mounted to a housing defining a suction chamber within the settling tank. The first and second tube sections move into a mating engagement upon guided movement of the drum member into the settling tank. The drum filter is guided in its movements into the tank by guide members located on either end thereof. In a first embodiment, a valve operating rod extends upwardly from within the second tube section to the upper level of the settling tank, and acts as a guide member. The valve operating rod is used to operate a valving means for isolating the suction chamber of a given drum filter from the liquid circulation system preparatory to its removal.

There is also provided in this first embodiment, a conical spider supporting the operating rod which also serves to guide the first tube section into mating engagement with the second tube section mounted to a vacuum suction chamber housing.

In a second embodiment, the second tube section extends upwardly into the upper regions of the tank, such as to enable positioning of the first tube section thereover, upon positioning of the drum filter preparatory to lowering the drum filter into the housing.

In both embodiments, there is also provided a channel guide member mating with square tube members affixed to the drum filter such that side to side movement of the drum filter is controlled as it descends into the settling tank.

In the second embodiment, there is also disclosed an arrangement for intermittently indexing the drum member by means of a wheel affixed to one end of the drum and formed with teeth, one of the teeth always positioned to be engaged by the flights of a drag-out conveyor as the flights of the conveyor are advanced through the settling tank. This engagement causes a limited rotation of the drum as the flight passes by, providing intermittent rotation of the drum for sequenced backwashing according to the aforementioned U.S. Patent.

DETAILED DESCRIPTION

The following detailed description uses certain specific terminology for the sake of clarity and a particular embodiment is described in accordance with the requirements of 35 USC 112, but it is to be understood that the same is not intended to be limiting and should not be so construed inasmuch as the invention is capable of taking many forms and variations within the scope of the appended claims.

Figure 1:
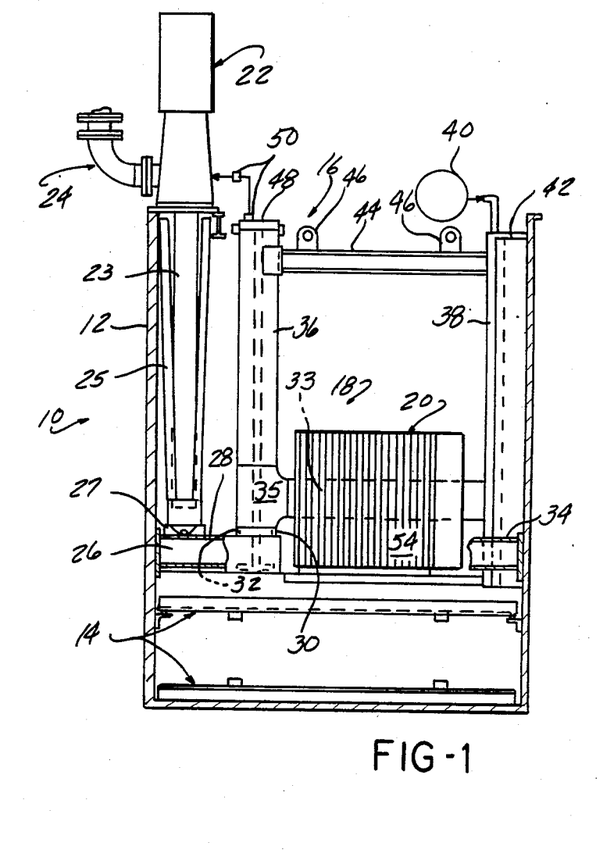
FIG. 1 is a partially sectional view of a settling tank and drum filter arrangement according to the present invention.

Referring to FIG. 1, a filter 10 according to the present invention is shown, which includes a settling tank 12. The settling tank 12 is adapted to receive the liquid to be filtered via a liquid circulation system, not shown. A drag-out conveyor 14 is also provided to remove accumulated solids from the lower level of the settling tank 12. A drum filter arrangement 16 is mounted above the level of the conveyor 14, including a drum filter 18.

The outer surface of the drum filter 18 is covered with a filter media layer 20 such as wedge wire wound over a series of axially extending circumferentially spaced passages 53 (FIG. 4), as described in the aforementioned U.S. Patent, and also hereinafter. Circulation of liquid to be filtered through the media layer 20 of the drum filter 18 is induced by a main circulation pump 22 having an outlet in communication with the remainder of the circulation system, generally indicated at 24. Pumping of liquid is from the interior of a suction chamber 26, defined by a housing 28 affixed to the interior of the settling tank 12 as shown.

Inflow of liquid through the filter media layer 54 is collected in the first tube section 30 attached to a tee 35 carried by the drum member 18 at one end, that is in turn fit over a second tube section 32 affixed to housing 28, which will be described hereinafter in further detail. Both the first and second tube sections 30 and 32, are generally vertically extending such as to be slidably interfit upon lowering of the drum filter 18 into the settling tank 12.

The drum filter 18 is mounted on a framework shown partially at 34, secured to the interior of the settling tank 12. The first tube section 30 has an upper extension 36 and the drum filter 18 also has affixed thereto a square tube member 38 on the other end from the first tube section 30 which provides a flow of backwashing liquid, which it receives from the square tube 38 from a source of filtered liquid 40, which may be comprised of a separate pump or by a tap into the outlet of the main circulation pump 22.

The square tube 38 is received within a channel member 42 affixed to the interior of the settling tank 12, to assist in guiding of the descending movement of the drum filter 18, into the tank 12.

A cross member 44 is fixed to the upper end of the square tube 38 and first tube extension 36 at the upper levels thereof. Lifting eye elements 46 are affixed to cross member 44, thereby located in the upper level of the settling tank 12, above the normal liquid level within the settling tank 12 so as to be readily accessible for maintenance lift out of the drum filter 18.

A Victaulic (TM) coupling 48 is utilized to close off the upper end of first tube extension 36. An air evacuation valve 50 is also included to eliminate air within the first tube section 30 and extension 36.

The main pump 22 includes an inlet tube 23 received within a standpipe 25, a check valve 27 also is provided to maintain the pump prime between operational cycles.

Figure 2:
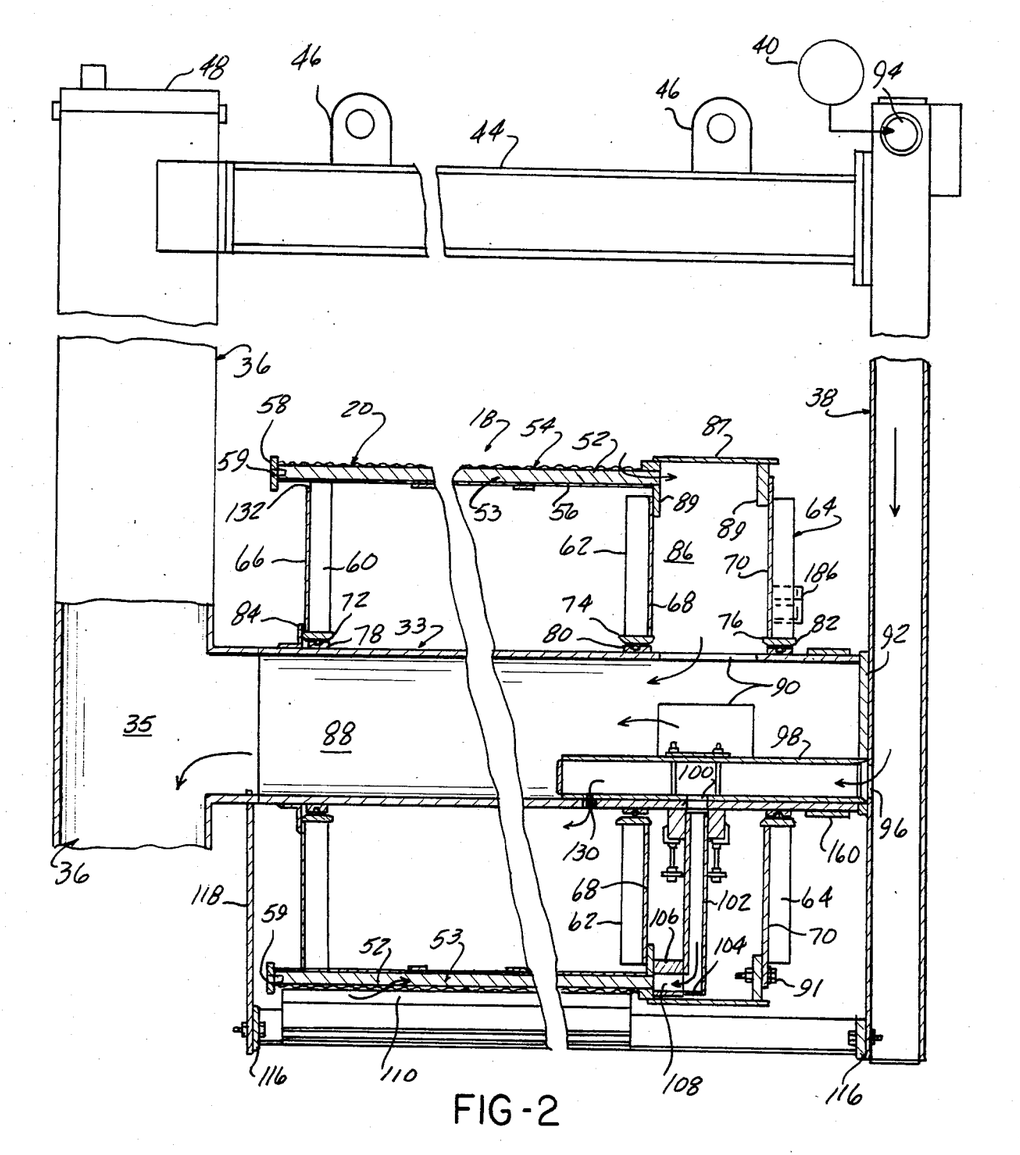
FIG. 2 is an enlarged sectional view of the drum filter shown in FIG. 1.
Figure 4:
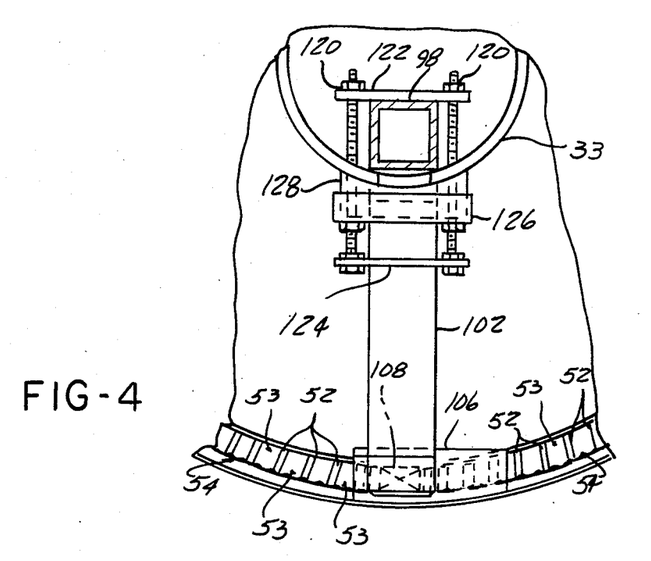
FIG. 4 is a fragmentary endwise view portion of the drum filter shown in FIG. 2.

Referring to FIG. 2, the details of construction of the drum filter 18 can be seen which is broadly similar to the drum filter disclosed in the aforementioned U.S. Pat. No. 4,407,720. The drum filter 18 includes a drum member 20 being formed of an array of spacer bars 52 circumferentially spaced to create axially extending flow passages 53 (FIG. 4). Covering the spacer bars 52 is a filter media layer 54, preferably taking the form of the so called "wedge wire" windings, welded to the spacer bars 52 to form the drum member 20.

The interior of the spacer bars 52 is welded to liner cylinder 56 of sheet metal, to also define in part the axially extending flow passages 53. Fixed to the ends of the spacer bars 52 is an annular ring 58, by means of threaded fasteners 59, sealing off the left side of the annular array of flow passages 53 as seen in FIG. 2.

The drum member 20 is rotatably supported on a stationary central tube 33 by radial spoke sets 60,62 and 64 and metal annular partition rings 66, 68 and 70, axially subdividing the inteiror space within the drum member 20. Hubs 72,74 and 76 are also provided supported on respective bearing rings 78,80, and 82 disposed on the fixed central tube 32. A hub 84 maintains the endwise location of the assembly on the fixed central tube 33.

The right end of the passages 53 as viewed in FIG. 2, open into a chamber 86 defined by sleeve 87 welded to rings 89, and partition rings 68 and 70 fastened thereto by fasteners 91. Chamber 86 thus collects inflow of liquid pasing through the wedge wire media layer 54, chamber 86 in turn communicating with the interior 88 of the fixed central tube 33 through a series of cut-out openings 90 formed in the fixed central tube 33 aligned with the collection chamber 86. The right end of the fixed tube 33 is closed by means of an end cap 92 welded thereto. The left end of central tube 33 has attached tee fitting 35.

Filtering flow of liquid thus occurs as indicated through the wedge wire media layer 54, axially down the length of the passages 53 intermediate the spacer bars 52 into the collection chamber 86, thence through openings 90 into the interior 88 of the central tube 33, and thereafter into tee 35, and suction chamber 26 in housing 28 for return to the circulating system.

An arrangement for establishing a sequenced backwash flow is provided, including square tube 38 having a fitting 94 in its upper end thereof adapted to be connected to a source of backwash liquid 40 as for example, a tap from the "clean" side of the pumping system, in the manenr well known to those skilled in the art.

A backwash flow of liquid passes through the interior of the square tube 38, thence through an opening 96 through the wall of the square tube 38 and end cap 92, to a square tube 98 mounted in the interior 88 of the fixed central tube 33. Square tube 98 extends to the left to an opening 100 aligned with a backwash tube 102, extending radially outward. An end cap 104 closes at the end of the tube 102. A side opening in tube 102 is aligned with a similar opening 108 in a plastic portion block 106 positioned to be aligned with the open ends of the intermediate passages 53 between the spacer bars 52, as shown.

As the drum 20 is rotated, by a mechanism to be described hereinafter, the opening 108 in the block 106 becomes successively aligned with the passages 53 to provide a sequential but continuous backwash action, as described in the aforementioned U.S. Patent.

The backwash tube 102 is secured to the interior of central tube 32 which also secures the backwash tube 98 by a pair of bolts 120 (FIG. 4) passing through clamping plates 122 and 124. Angles 126 compress a sealing block 128 against the outside diameter of the fixed central tube 32.

The backwash tube 98 also extends axially beyond the feed tube 102 to a purging port 130 formed through the backwash tube 98 and the OD of the fixed central tube 33, creating a low volume flow through the interior of the drum 20 such as to minimize the stagnation of liquid in the interior thereof to prevent bacterial growth. The purging flow is able to pass around the gaps 132 between the plate 66 and the inner liner cylinder 56.

Figure 3:
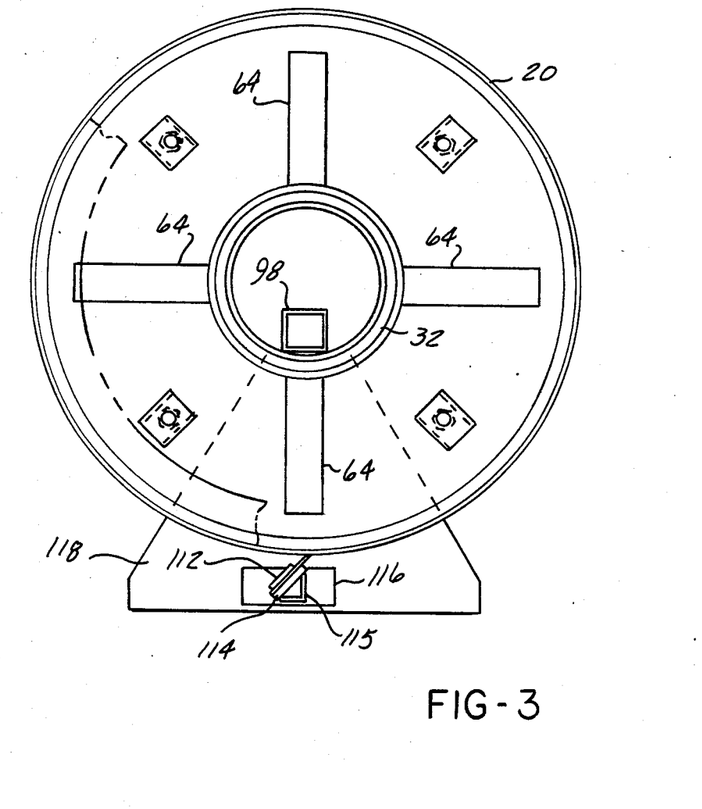
FIG. 3 is an endwise view of the drum filter shown in FIG. 2.

In conjunction with the backwashing arrangement there is also provided a scraper blade 110, clamped between bars 112 and 114 as seen in FIG. 3, mounted between end pieces 116, which are bolted as shown, respectively to a square tube 38 on the right and a support web 118 on the left in turn fitted to the OD of the central tube 33 and angle 115.

The porting block 106, as shown in FIG. 4, is elongated such as to block liquid flow through a particular passage 53 being scraped, to eliminate the pressure differential otherwise existing and tending to cause a tight adherence of the filtered material to the media layer 54.

The fixed central tube 33 is connected to tee 35 with a downwardly extending vertical portion attached to the first tube section 30, to be mated with the second tube section 32 carried by the suction chamber housing 26 as will be described hereinafter in further detail.

The other leg of the tee 35 is connected to the upwardly extension 36.

Figure 5:
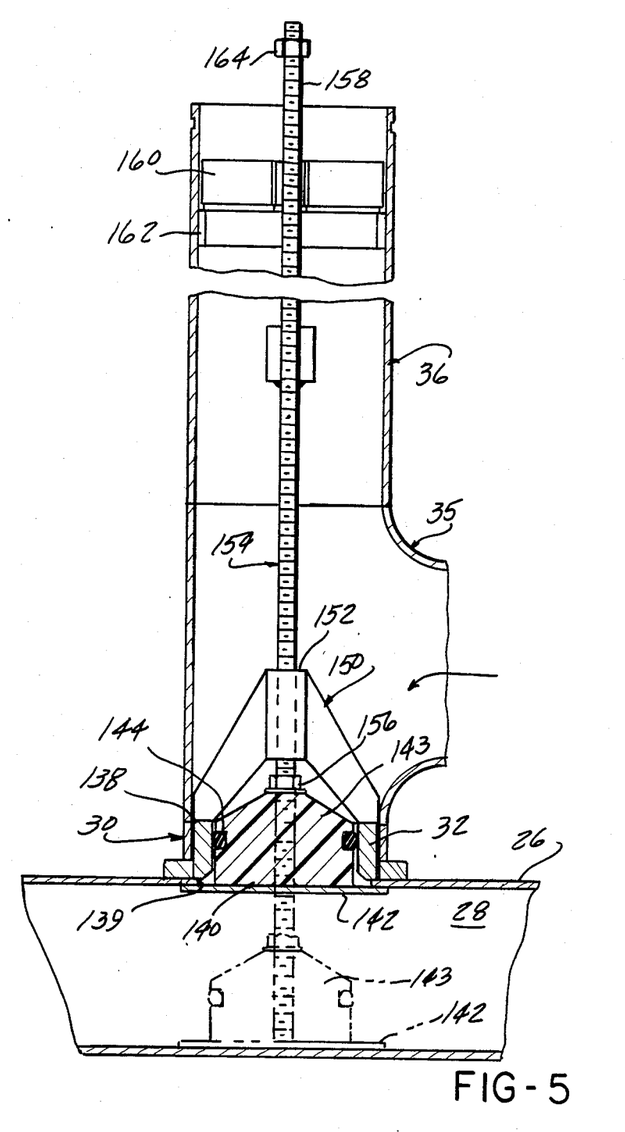
FIG. 5 is a sectional view depicting the fluid connection between the drum filter and suction chamber housing.

Referring to FIG. 5, the details of the connection of the first and second tube sections can be seen as well as the associated valving means for isolating the drum fluid connection upon removal of a particular drum. A suction in chamber 26 is created by operation of the main pump 22, shown in FIG. 1. Filtering flow from the drum filter 18 is thus induced into the suction chamber 26 through the port 139. The fluid connection is established by the second tube secton 32 extending vertically, forming a part of a flange fitting 138 affixed to the suction chamber housing 28, having a nipple portion defining second tube section 32.

The first tube section 30 is adapted to be slidably fit thereover upon movement of the drum filter 18 downwardly within the settling tank 12 as heretofore described.

A valving mechanism is also provided which includes a valving plub assembly 140 consisting of end plate 142 and a plastic plug 143 affixed thereto with an O-ring seal 144 recessed into a groove formed into the valve plug 143. The valve plug 143 is adapted to be sealingly fit within the inside diameter of the second tube section 32.

A conically shaped spider 150 mounted atop fitting 138 has arms converging to a central hub 152 which receives an operating rod 154 extending upwardly through the inside of the second tube section 32 and through and above the end of the tube extension 36.

The operating rod 154 has the end plate 142 welded thereto, while the plug 143 is adapted to freely rotate thereon. A nut 156 is welded thereto such as to trap the valve plug 143 between it and plate 142, while enabling the valve plug 143 to spin free. Rotation of the valve plug 143 within the inside diameter of the first tube section 30 is thus not required in order to cause movement thereinto to eliminate rubbing friction.

The hub 152 is threaded and mates with the threaded outside diameter of operating rod 154, such that rotation thereof causes vertical movement of the valve plug assembly 140 into and out of the inside diameter of the second tube section 32 to control communication of suction chamber 28 with the port 139. Operating rod 154 includes an upper section 158 passing through a spider 160 and keeper bars 162. The operating rod 158 extends out of the upper tube extension 36 with the Victaulic coupling 48 removed incidental to installation or removal of the drum filter 18.

A removable nut 164 is provided at the upper end to provide a wrenching surface, upon pinning the nut 164 thereto to enable rotation of rod 154 and opening and closing of the valving mechanism.

The operating rod 154 acts together with the conical spider 150 as a guide member when lowering the filter unit in place. The spider 150 is first removed together with nut 164, prior to installation of the drum. The first tube section 30 is first positioned to receive the upper section 158 of the operating rod 154 and lower into place. Spider 150 is then put in position and the nut 164 installed and rotated to cause downward threaded advance of the operating rod 154 and opening the valve plug assembly 140, and the Victaulic coupling 48 reinstalled.

The tube section 30 is slidably fit over the second tube section 32 to establish the fluid connection. It is noted that a fluid tight seal is not required since the filter openings defined by the spaces between the wedge wire in the media layer 54 are sized at several thousands of an inch, and relay on build-up of filtered solids to achieve fine filtration capability, or are used in conjunction with any precoating system which may be utilized. Thus, a simple slip fit provides an entirely adequate seal for the purposes of the operation of the filter unit, as will be appreciated by those skilled in the art.

Figure 6:
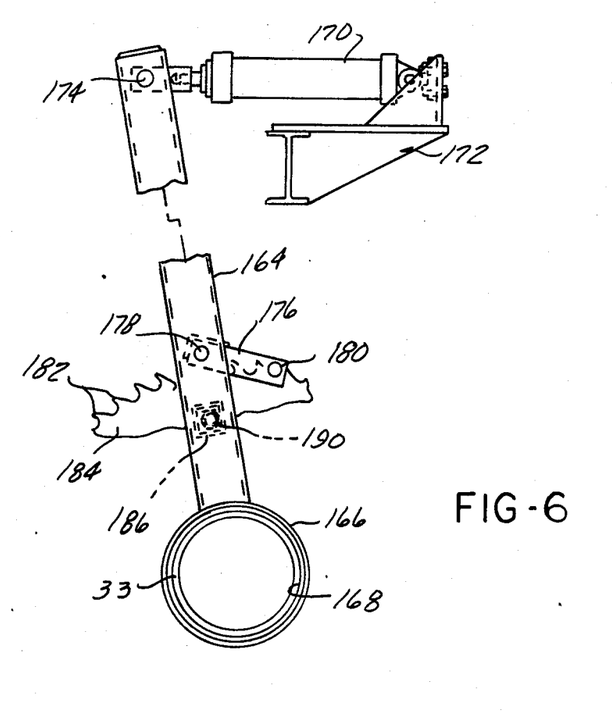
FIG. 6 is a fragmentary endwise view of the operating drive components associated with the drum filter arrangement shown in FIG. 1.

As noted, an indexing rotation of the drum member 20 is required for operation of the sequential backwashing system. A simple ratchet drive may be employed using a ratchet arm 164 mounted to a hub 166 (FIG. 6) received over a band 168 shown in FIG. 2 welded over the outside diameter of the tube 33. A stroking cylinder 170 is pinned at 174 to the upper end of the ratchet arm 164. Intermediate the ratchet arm 164 is a pivoted pawl 176, supported on the ratchet arm 164 by a pin 178, and having a drive pin 180 adapted to mate with drive teeth 182 formed on a ratchet wheel 184. Ratchet wheel 184 is not shown in FIG. 2, but is adapted to be bolted to a series of tube sections 186 welded to the web partition 70 by means of weld nut 190. Thus upon stroking of the cylinder 170 an indexing rotary advance of the drum 20 on the fixed central tube 33 is accomplished to provide the sequential backwashing of the areas between the axial by flow successively through each of the axial flow passages 53.

Figure 7:
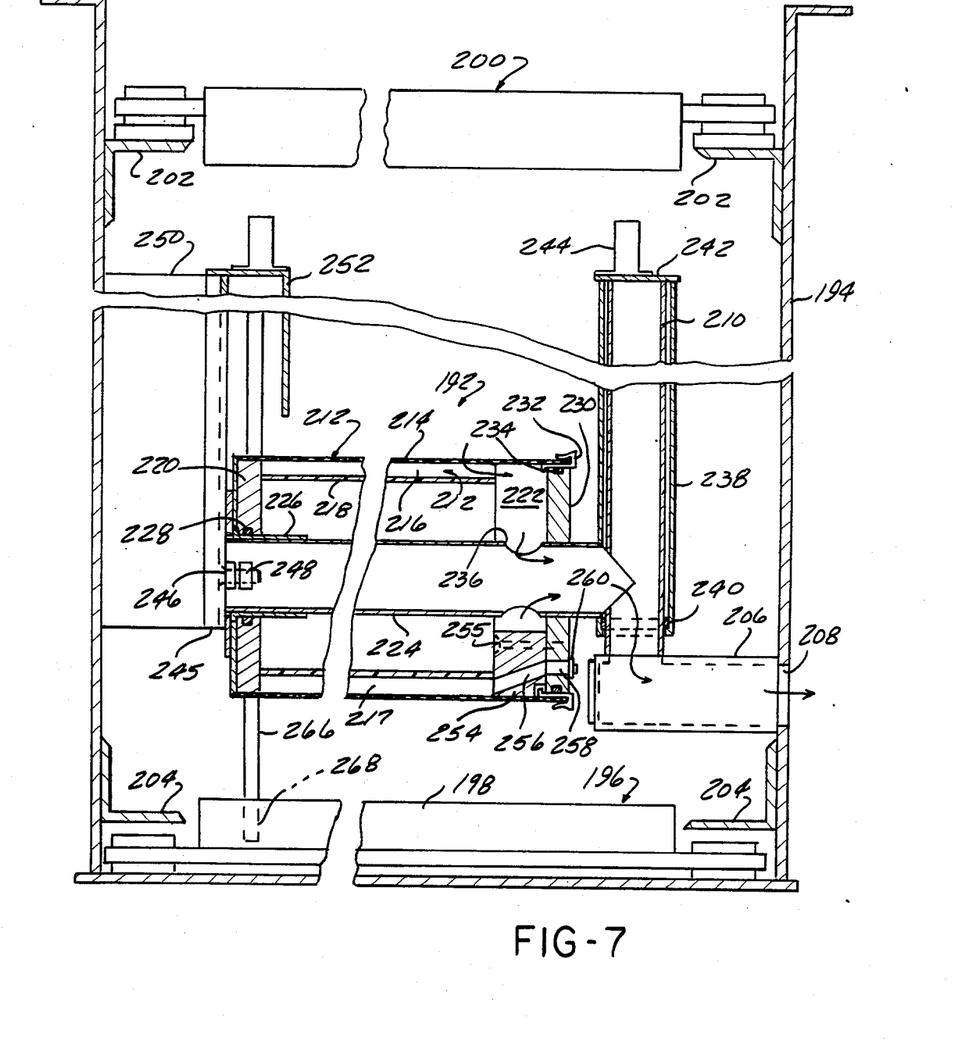
FIG. 7 is a partially sectional view of a settling tank and drum filter arrangement according to a second embodiment of the present invention.
Figure 8:
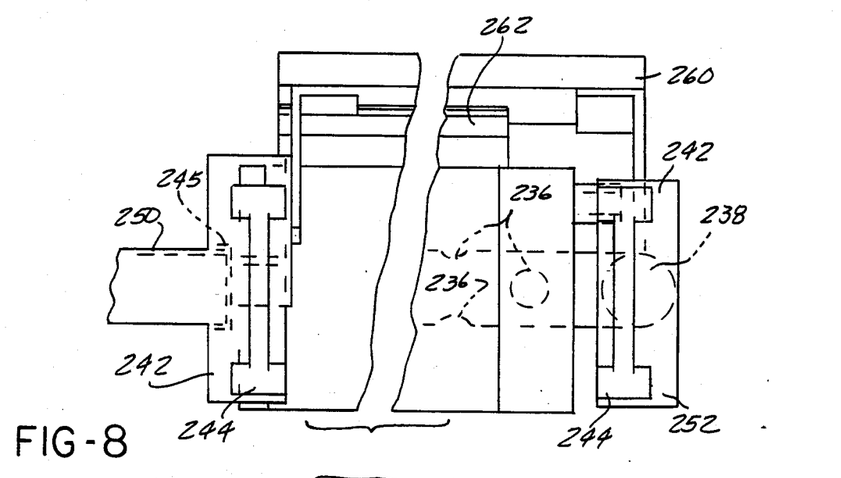
FIG. 8 is a plan view of the drum filter shown in FIG. 7.
Figure 9:
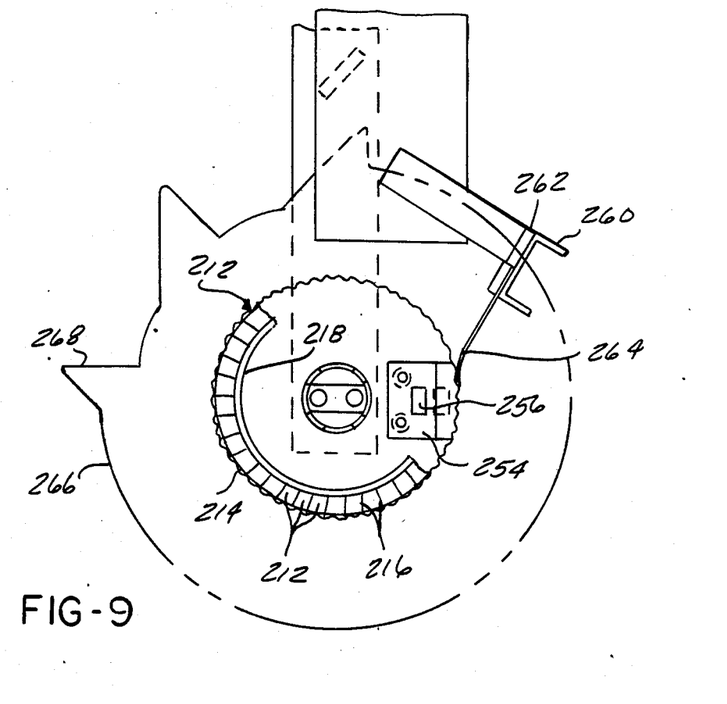
FIG. 9 is an endwise view of the drum filter shown in FIG. 7.

An alternate embodiment is described and depicted in FIGS. 7 through 9. In this embodiment, the drum filter 192 is likewise mounted in a settling tank 194. A drag-out conveyor 196 passes through the lower reaches of settling tank 194 with a series of spaced flights 198 adapted to carry accumulated solids out of settling tank 194 with a return overhead section 200 of the conveyor also shown in the upper reaches of the settling tank 194 supported on angle tracks 202 located on either side of the settling tank 194 walls, a track 204, provided in the lower tank regions in order to confine the conveyor there below.

In this embodiment, a suction chamber housing 206 is also provided welded to the inside wall of the settling tank 194, but with a plumbing connection made with a opening 208 that to be connected by suitable fittings to the remainder of the liquid circulation system (not shown). Fixed to the suction housing 206 is an upstanding tube section 210, which in this embodiment extends to the upper regions of the settling tank 194, as shown. The drum filter 192 similarly includes a drum member 212 including an outer wedge wire or other filter media layer 214 wound about a series of axially extending spacer bars 216 to define axially extending circumferentially spaced flow passages 217. A liner cylinder 218 and end cap 220 close off the inside and left hand end of the passages 217, intermediate the bars 216 to thus define the axial flow passages. Collection chamber 222 is located at the right hand end of the spacer bars 216 and adapted to collect inflow of liquid contained in the settling tank 194 through the outer filtering media layer 214 and thence through the axial flow passages 217.

Drum member 212 is simliarly to the first described embodiment mounted on a central stationary tube 224. Mounting is achieved by a bearing hub 226 received over the fixed central tube 224 with an O-ring seal 228, rotatably mounting the end 220. A second end plate 230, defining in part the collection cavity 222, is received within a bearing clip 232 with a seal 234 likewise sealing the rotating parts.

A plurality of holes 236 in turn are formed through the section of the fixed central tube 224 in registry with the collection chamber 222 to thus allow flow through the interior of the fixed central tube 224 to enter the interior of a first tube section 238 adapted to be slidably interfit over the second tube section 210.

The lower section of the first tube section 238 provided with a ring 240 such that at installation, as the tube section 238 reaches bottom, a tighter fit is achieved by passing within the ring 240 allowing a relatively loose fit between the two sections during most of the descending travel of the drum 212 into the settling tank 194.

The tube section 238 is closed at its upper end by end cap 242 and a lifting handle 244 is welded thereto. The opposite end of the drum 212 is also provided with a guiding arrangement including a channel guide member 245 extending vertically upward and affixed to the fixed tube 224 by means of a threaded fastener 246 mating with a mounting bar 248 within the interior of the fixed central tube 224.

Channel guide member 245 is received in a weldment 250 secured to the interior of the settling tank 194. Guiding of the descending movement of the drum 212 is thus achieved at both ends thereof at installation and removal.

The guide channel 245 is provided with a cap structure 252 rectangular and similar in plan view as cap 242 to provide a mounting surface for lifting handle 244 also mounted thereto in order to enable ready lift-out of the filter drum 212 from the settling tank 194.

A sequential backwashing is also achieved by means of a porting block 254 mounted within the chamber 222 and having a port 256 formed therein aligned with a through passage 258 and fitting 260 adapted to be connected to a source of clean backwash liquid. As the drum 212 is rotated by means to be described hereinafter, the port 256 becomes aligned successively with the axial passages 217 for sequential backwashing flow as in the above described embodiment.

A scraper is also provided including a mounting channel 260 and plate 262 clamping a scraper blade 264, (FIG. 9) fastened by means of fasteners 255 passing into end partition 230 as shown. A spacer portion block 254 similarly as in the above described embodiment blocks off flow from the passages 217 to enable ready scraping of the accumulated filtered solids in the outer surface of the wedge wire layer 214.

The drive arrangement of the embodiment of FIGS. 7-9 is simplified over the previous arrangement and consists of a drive wheel 266 affixed to the outside of the left hand end of the drum member 212 and having a series of drive teeth 268 machined therein about the periphery thereof. The drive teeth 268 are adpated to be individually successively positioned in the path of the chain flights 198, as seen in FIG. 7, such that as each flight passes a given tooth 268, an incremental rotation of the drum 212 will be caused to occur. Cut-outs can also be provided in the flights 198 to control the frequency of indexing rotation with respect to the rate of movement of the conveyor flights 198 through the interior of the settling tank 194.

Accordingly, it can be appreciated that a much simpler rotary drive is achieved by this arrangement to provide a economy of manufacturing and simplicity in construction of the filter according to this design.

It can be appreciated from the above description that a simple yet effective means for establishing the fluid connections to the filter arrangements are provided which is executed simply by the descending movement of the filter arrangements into the settling tank and without the need for complex clamping mechanisms and sealing, or the need to establish a clamping of submerged components. The guiding of the descending movement is achieved by the guide member and tube sections which insures the proper placement of the filter arrangement such as to reliably establish the fluid connections.

There are many variations of the particulars as described herein, as will be apparent to those skilled in the art.

I claim:

1. In a horizontal drum filter arrangement of the type including a settling tank adapted to receive liquid to be filtered;
   a housing mounted within said tank defining a suction chamber;
   pumping means for causing liquid to be drawn from said suction chamber to return;
   a drum filter mounted to be completely submerged in said tank, said drum filter including an outer filter media layer surrounding a drum member and passage means for collection liquid inflow through said filter media layer, said passage means including a tube centrally disposed in said drum member and extending out one end thereof;
   a first tube section connected to said central tube to extend normally to said central tube while adapted to receive flow therefrom, and a vertically extending second tube section mounted on said housing and opening into said suction chamber, each of said first and second tube sections sized to be loosely interfit to be adapted to be slidably interfit together by descending movement of said drum filter into said tank, and an elongated first guide member fixed within said tank and extending upwardly from said housing and adapted to engage said first tube section through said descending movement of said drum member and guide said first and second tube sections to be interfit together, whereby a fluid connection is thereby established between said drum filter and said suction chamber.

2. The filter arrangement according to claim 1, wherein said elongated first guide member is configured to be able to be received within said first tube section to guide said drum filter during descending movement into said tank.

3. The filter arrangement according to claim 2 wherein said elongated first guide member comprises an extension section extending upwardly from said second tube section into the upper region of said tank.

4. The filter arrangement according to claim 2 further including a member mounted to the said drum member at one end thereof opposite said end adjacent said first tube section, and also including an elongated second guide member mounted to said tank adapted to be interfit with said member fixed to said drum to thereby guide descending movement of said drum filter in said tank.

5. The filter arrangement according to claim 4 wherein said first tube section extends into the upper region of said tank with said drum filter installed therein, and further including a pair of spaced lifting features supported by the upper end of said member and said first tube section to enable lifting of said drum member out of said tank.

6. The filter arrangement according to claim 1 further including valve means selectively operable to close communication of said second tube section mounted to said housing with said suction chamber.

7. The filter arrangement according to claim 6 wherein said valve means includes an elongated operating rod and means mounting said operating rod to extend vertically upwardly through said second tube section to the upper region of said tank, said operating rod constituting said elongated first guide member.

8. The filter arrangement according to claim 7 wherein said means mounting said operating rod includes a cone-shaped spider mounted atop said second tube section acting to guide said first tube section over said second tube section, said operating rod passing through said spider.

9. The filter arrangement according to claim 7 wherein said valve means includes a seal plug and means threadably connecting said seal plug to said operating rod to cause axial movement of said seal plug into said second tube section by continued rotation of said operating rod.

10. In a filter arrangement of the type including a tank, a drum filter mounted in said tank of the type including a drum member having a series of circumferentially spaced axially extending passages and an outer filter layer covering said passages, and means for directing backwashing flow into said passages successively including means for rotating said drum member about its axis, and a conveyor mounted extending through said tank passing beneath said drum member with a clearance space therebetween, means for advancing said conveyor through said tank to remove solids therefrom, the improvement comprising a wheel affixed to said drum member for rotation therewith about said drum member axis of rotation, said wheel having a series of circumferentially spaced engagement features carried thereon extending radially outwardly from said drum member, and a series of engagement features carried on said conveyor adapted to engage successively said features on said wheel as said conveyor is advanced through said tank, to thereby cause rotation of said drum filter.

11. The arrangement according to claim 10 wherein said conveyor features are spaced so that each successive feature comes into engagement with a respective wheel feature after the previous conveyor and wheel features have become disengaged whereby said drum member is intermittently rotated by said conveyor movement.

* * * * *

UNITED STATES PATENT AND TRADEMARK OFFICE
CERTIFICATE OF CORRECTION

PATENT NO. : 4,670,143
DATED : June 2, 1987
INVENTOR(S) : Jack R. Bratten

It is certified that error appears in the above-identified patent and that said Letters Patent is hereby corrected as shown below:

Column 2, line 11, "filtering" should be --filter--.

Column 4, line 45, "inteiror" should be --interior--.

Column 5, line 8, "manenr" should be --manner--.

Column 5, line 17, "portion" should be --porting--.

Column 6, line 8, "plub" should be --plug--.

Signed and Sealed this

Twenty-seventh Day of October, 1987

Attest:

DONALD J. QUIGG

*Attesting Officer*  *Commissioner of Patents and Trademarks*